(12) United States Patent
Fotiadis et al.

(10) Patent No.: US 8,601,831 B2
(45) Date of Patent: Dec. 10, 2013

(54) REFRIGERATION MACHINE AND OPERATING METHOD FOR IT

(75) Inventors: Panagiotis Fotiadis, Giengen (DE); Hans Ihle, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1330 days.

(21) Appl. No.: 12/310,340

(22) PCT Filed: Aug. 7, 2007

(86) PCT No.: PCT/EP2007/058163
§ 371 (c)(1),
(2), (4) Date: Feb. 20, 2009

(87) PCT Pub. No.: WO2008/025650
PCT Pub. Date: Mar. 6, 2008

(65) Prior Publication Data
US 2009/0193820 A1 Aug. 6, 2009

(30) Foreign Application Priority Data
Aug. 29, 2006 (DE) .......................... 10 2006 040 380

(51) Int. Cl.
*F25D 21/00* (2006.01)
*F25D 21/06* (2006.01)
*F25B 47/00* (2006.01)
*F25B 25/00* (2006.01)

(52) U.S. Cl.
USPC ........ 62/498; 62/80; 62/151; 62/152; 62/277; 62/278

(58) Field of Classification Search
USPC ........ 62/498, 80, 81, 151, 152, 155, 277, 278
See application file for complete search history.

(56) References Cited

U.S. PATENT DOCUMENTS

| | | | |
|---|---|---|---|
| 3,871,187 A | 3/1975 | Skvarenina | |
| 3,894,404 A | 7/1975 | Stanton | |
| 4,167,102 A * | 9/1979 | Willitts | 62/152 |
| 4,285,210 A * | 8/1981 | McCarty | 62/325 |
| 4,346,755 A * | 8/1982 | Alley et al. | 165/231 |
| 4,420,943 A * | 12/1983 | Clawson | 62/81 |
| 5,269,151 A * | 12/1993 | Dinh | 62/81 |
| 5,564,280 A | 10/1996 | Schilling et al. | |
| 5,630,323 A | 5/1997 | Niijima et al. | |
| 5,669,222 A * | 9/1997 | Jaster et al. | 62/156 |
| 5,806,321 A * | 9/1998 | Bendtsen et al. | 62/80 |
| 6,000,231 A * | 12/1999 | Alsenz | 62/81 |
| 6,227,812 B1 * | 5/2001 | Kawaguchi et al. | 417/222.2 |
| 6,672,090 B1 | 1/2004 | Healy et al. | |
| 6,725,680 B1 * | 4/2004 | Schenk et al. | 62/186 |

(Continued)

FOREIGN PATENT DOCUMENTS

| | | | | |
|---|---|---|---|---|
| GB | 2348947 | * | 10/2000 | F25D 21/00 |
| GB | 2348947 A | | 10/2000 | |

(Continued)

*Primary Examiner* — Mohammad M Ali
*Assistant Examiner* — Henry Crenshaw
(74) *Attorney, Agent, or Firm* — James E. Howard; Andre Pallapies

(57) ABSTRACT

A refrigeration machine for a domestic refrigerator includes a compressor, a condenser and an evaporator, which are connected to form a refrigerant circuit, wherein a stop valve is arranged in a refrigerant path from the condenser to the evaporator.

20 Claims, 1 Drawing Sheet

(56) References Cited

U.S. PATENT DOCUMENTS

| | | | |
|---|---|---|---|
| 6,830,239 B1 * | 12/2004 | Weber et al. | 261/121.1 |
| 6,843,065 B2 * | 1/2005 | Flynn | 62/156 |
| 2001/0027664 A1 * | 10/2001 | Ross | 62/513 |
| 2004/0020221 A1 * | 2/2004 | Flynn | 62/156 |
| 2004/0103677 A1 | 6/2004 | Hirota | |
| 2004/0250555 A1 * | 12/2004 | Dube | 62/81 |
| 2005/0189431 A1 * | 9/2005 | Nakayama et al. | 237/12 |
| 2005/0204757 A1 | 9/2005 | Micak et al. | |
| 2007/0277543 A1 | 12/2007 | Bersch | |
| 2009/0193820 A1 * | 8/2009 | Fotiadis et al. | 62/80 |

FOREIGN PATENT DOCUMENTS

| | | |
|---|---|---|
| JP | 10332245 A | 12/1998 |
| JP | 2002243339 A | 8/2002 |
| JP | 2002364937 A | 12/2002 |
| JP | 2004340402 A | 12/2004 |

\* cited by examiner

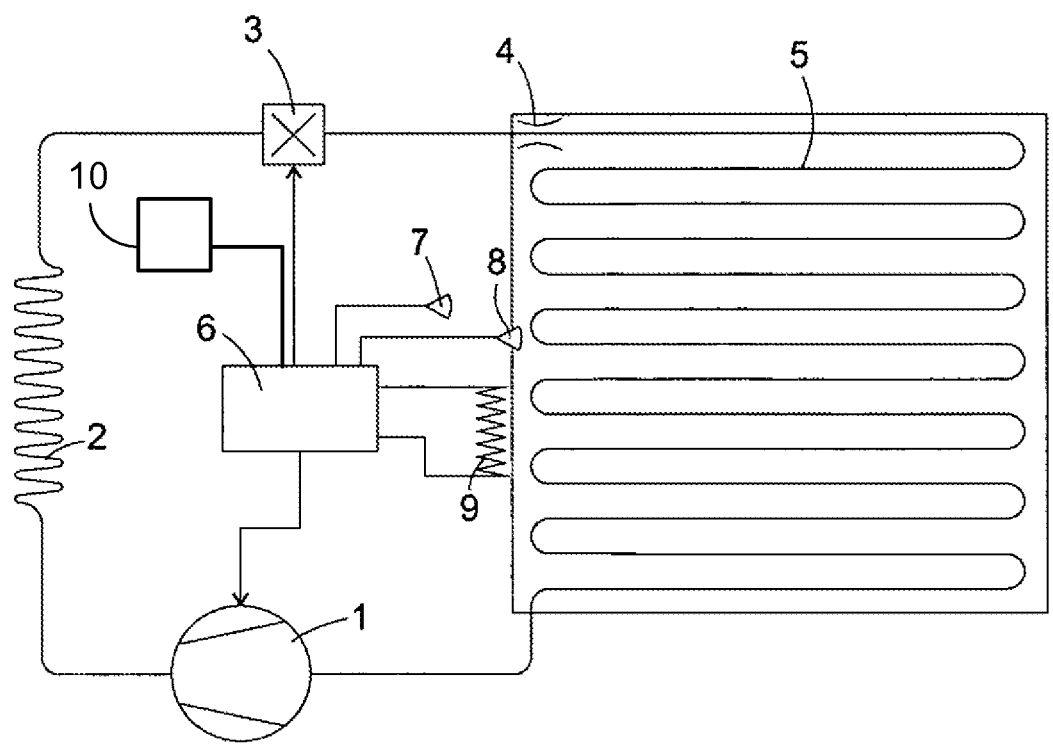

REFRIGERATION MACHINE AND OPERATING METHOD FOR IT

BACKGROUND OF THE INVENTION

The present invention relates to a refrigerating machine, in particular for a domestic refrigerating appliance, as well as to an operating method for a refrigerating machine of said kind.

A refrigerating machine typically comprises a compressor, a condenser and an evaporator which are connected in a refrigerant circuit. Refrigerant compressed by the compressor and heated in the process first flows through a condenser, in which it releases heat to a warm reservoir and condenses in the process, and then through an evaporator, in which it cools down due to expansion to such an extreme extent that it is able to absorb heat from a cold reservoir. The refrigerant evaporated as a result flows back to the compressor.

In most applications of refrigerating machines, in particular in the case of domestic refrigerating appliances, the compressor does not operate continuously, but instead the compressor's operating phases and non-operating phases alternate. Whereas in the operating phases the compressor holds the refrigerant constantly at a high pressure in the condenser and at a low pressure in the evaporator, a pressure equalization takes place between the condenser and evaporator when the compressor is switched off. The drop in pressure in the condenser leads to an adiabatic cooling there, with the result that the thermal energy contained in the refrigerant can no longer be released to the warm reservoir. Conversely there is an increase in pressure in the evaporator, with the result that the temperature of the evaporator—and also that of a space cooled by the evaporator—increases in an undesirable manner.

In order to minimize the energy losses associated with each switching-off of the compressor, it initially appears obvious to make the operating and non-operating phases of the compressor as long as possible. However, long operating and non-operating phases cause extreme temperature fluctuations in the reservoirs. If, for example, the cold reservoir is the storage compartment of a refrigerator, extreme variations in temperature can lead to chilled food products temporarily being inadequately cooled, with the consequence that their storage life is shortened, or to their being damaged due to being supercooled. While no damage to the frozen food is likely in the case of a freezer if the food is cooled down by several degrees below the long-term storage temperature, a temporarily unnecessarily low storage temperature of this kind nonetheless leads to an intensified influx of heat from outside into the storage compartment and is therefore also uneconomical.

BRIEF SUMMARY OF THE INVENTION

The object of the invention is therefore to disclose a different approach by means of which the efficiency of an intermittently operated refrigerating machine can be improved.

The object is achieved firstly in that in the case of a refrigerating machine having a compressor, a condenser and an evaporator which are connected in a refrigerant circuit, a stop valve is disposed in a refrigerant path from the condenser to the evaporator. Since said valve is closed each time the evaporator is switched off, a high pressure can be maintained in the condenser in the non-operating phases of the evaporator. Since the stop valve is opened when the compressor is restarted, a refrigerant expanded by way of a high pressure difference and correspondingly cold is immediately available in the evaporator. A preliminary startup phase of the compressor that the latter conventionally requires in order to build up the pressure difference between condenser and evaporator that is required for cooling is no longer necessary.

A control unit for closing the stop valve when the compressor is switched off and opening the stop valve when the compressor is switched on is beneficially part of the refrigerating machine.

The control unit can advantageously be set up either to open or not to open the stop valve when the compressor is switched off. Opening the stop valve with the compressor switched off makes sense in particular when the evaporator is being defrosted, since in this case the inflow of refrigerant expanded by way of a slight pressure difference and correspondingly warm into the evaporator is altogether desirable in order to achieve fast defrosting.

In order to accelerate the defrosting process further, an electric heater can be assigned to the evaporator.

In order to decide on the need for defrosting, the control unit can additionally be connected to an icing sensor disposed on the evaporator and/or to a timer.

The object is further achieved by means of a method for operating a refrigerating machine of the above-described type, wherein the compressor is operated intermittently and the stop valve is closed when the compressor is switched off or, as the case may be, the stop valve is opened when the compressor is switched on.

The defrosting can be carried out in particular in a time-controlled manner at regular intervals, or it can be carried out when a critical icing of the evaporator is detected.

BRIEF DESCRIPTION OF THE DRAWINGS

Further features and advantages of the invention will emerge from the following description of an exemplary embodiment with reference to the attached FIGURE.

FIG. 1 shows a block diagram of a refrigerating machine according to the invention.

DETAILED DESRIPTION OF THE PRESENT INVENTION

A refrigerant circuit of the refrigerating machine runs from a compressor 1 sequentially by way of a condenser 2, a stop valve 3, a restrictor 4 and an evaporator 5, back to the compressor 1. Any known designs such as, say, a wound evaporator, a wire tubular evaporator etc. are suitable for the evaporator 5; schematically shown in the FIGURE is a plate-type evaporator having a tube running in a serpentine shape on a metal plate and in which the restrictor 4 is integrated on the plate in the form of a capillary tube.

The refrigerating machine is part of a domestic refrigerating appliance whose design is generally known and is therefore not shown here. An electronic control unit 6 controls the operation of the compressor 1 and the status—open or closed—of the stop valve 3 with the aid of a temperature sensor 7 which is installed in a storage compartment of the refrigerating appliance that is cooled by the evaporator 5 and an icing sensor 8 disposed on the evaporator 5 itself. When the compressor 1 is in the switched-off state, the control unit 6 compares the temperature reported by the temperature sensor 7 with a settable upper limit value and if it detects that the limit value has been exceeded it puts the compressor 1 into operation and opens the stop valve 3. Refrigerant under high pressure that is still stored in the condenser 2 from a preceding operating phase of the compressor 1 flows through the restrictor 4 into the evaporator 5, expanding and cooling down in the process. Thus, cooling capacity is available at the evaporator 5 practically without delay when the compressor 1 is switched on.

Depending on the startup behavior of the compressor 1, the start time of the compressor and the time of opening of the stop valve 3 can be slightly offset relative to each other, the time offset being chosen such that a pressure fluctuation in the condenser 2 caused by the starting of the compressor and the opening of the valve is minimized.

With the compressor 1 running, the control unit 6 compares the temperature reported by the temperature sensor 7 with a lower limit value and switches the compressor 1 off again if the temperature undershoots said limit value. At this time a check is carried out to determine whether the icing sensor 8 is indicating a critical icing of the evaporator 5 that will necessitate defrosting. If this is not the case, the control unit 6 closes the stop valve 3 at the same time as the compressor 1 is switched off in order to maintain the overpressure in the condenser 2 in the succeeding non-operating phase of the compressor 1.

If defrosting is recognized as necessary, which can typically be the case at time intervals of several days, the stop valve 3 remains open and a pressure equalization is produced between the condenser 2 and evaporator 5. The associated pressure increase in the evaporator 5 causes on the one hand an adiabatic heating of the refrigerant already contained in the evaporator 5; on the other hand, the cooling-down of the refrigerant flowing through the restrictor 4 in the course of the pressure equalization slows down as the pressure difference decreases, with the result that toward the end of the pressure equalization process increasingly warm refrigerant reaches the upstream region of the evaporator 5 and thereby heats up the evaporator 5.

Further heat required for defrosting the evaporator 5 is supplied by an electric heater 9 that is likewise controlled by the control unit 6.

In order to maximize the heat input into the evaporator 5 by means of the refrigerant during defrosting, it can be provided that the stop valve 3 will be opened intermittently during the defrosting process. In this way the pressure equalization is slowed down and refrigerant which expands during the pressure equalization in the condenser 2 and cools down in the process has the opportunity to heat up again in the condenser 2 itself in order then to enter the evaporator 5 at a temperature that is all the warmer in a later phase of the pressure equalization.

According to an alternative embodiment the direct monitoring of the icing of the evaporator 5 by means of the icing sensor 8 can be replaced by an indirect estimation of the icing, for example by the control unit 6 being coupled to a timer 10 in order to initiate a defrosting process in each case after the expiry of a predefined period of time in which an ice layer requiring defrosting normally forms.

Various measures can be taken to refine the estimation of the icing by the control unit 6. Thus, for example, the control unit 6 can be coupled to a door switch, which is provided in most domestic refrigerating appliances for switching an interior light on and off, for the purpose of estimating, on the basis of the number of times the door is opened and/or their duration, an amount of moisture introduced into the appliance as a result of the door's being opened. In order to make an estimation of said kind more accurate, an ambient temperature sensor can also be provided which enables the moisture content of the ambient air to be estimated.

The invention claimed is:

1. A refrigerating machine comprising:
a refrigerant circuit having
a compressor;
a condenser;
a restrictor;
an evaporator, the compressor, the condenser, the restrictor, and the evaporator being operatively connected to one another; and
a stop valve disposed in a refrigerant path extending from the condenser to the evaporator; and
a control unit that controls the stop valve, the control unit being configured to open the stop valve a plurality of times during a single defrosting operation and close the stop valve a plurality of times during the single defrosting operation, the single defrosting operation being performed only when the compressor is switched off;
wherein the refrigerating machine is configured such that a refrigerant flows from the condenser to the evaporator during the single defrost operation through the stop valve and the restrictor, and
the opening and closing of the stop valve a plurality of times during the single defrosting operation allows the refrigerant to heat up in the condenser during the times when the stop valve is closed, and allows the heated refrigerant to flow into the evaporator when the stop valve is open.

2. The refrigerating machine according to claim 1, wherein the control unit is configured to close the stop valve occasionally when the compressor is switched off, open the stop valve occasionally when the compressor is switched off, and open the stop valve when the compressor is switched on.

3. The refrigerating machine according to claim 1 and further comprising an icing sensor disposed on the evaporator, the icing sensor being operatively connected to the control unit.

4. The refrigerating machine according to claim 1 and further comprising an electric heating apparatus operatively associated with the evaporator.

5. The refrigerating machine according to claim 1 and further comprising a restrictor disposed in the refrigerant path from the stop valve to the evaporator.

6. A domestic refrigerating appliance comprising:
a refrigerating machine including a refrigerant circuit having
a compressor;
a condenser;
a restrictor,
an evaporator, the compressor, the condenser, the restrictor, and the evaporator being operatively connected to one another; and
a stop valve disposed in a refrigerant path extending from the condenser to the evaporator; and
a control unit that controls the stop valve, the control unit being configured to open the stop valve a plurality of times during a single defrosting operation and close the stop valve a plurality of times during the single defrosting operation, the single defrosting operation being performed only when the compressor is switched off,
wherein the refrigerating machine is configured such that a refrigerant flows from the condenser to the evaporator during the single defrost operation through the stop valve and the restrictor, and
the opening and closing of the stop valve a plurality of times during the single defrosting operation allows the refrigerant to heat up in the condenser when the valve is closed, and permits the heated refrigerant to flow into the evaporator when the valve is open.

7. A method for operating a refrigerating machine having a compressor, a condenser, a restrictor, and an evaporator operatively connected to one another thereby forming a refrigerant circuit, a stop valve disposed in a refrigerant path extending from the condenser to the evaporator, and a control unit, the method comprising:
switching off the compressor,
controlling the stop valve with the control unit such that the stop valve is opened a plurality of times during a single defrosting operation and the stop valve is closed a plurality of times during the single defrosting operation,
flowing a refrigerant from the condenser to the evaporator during the single defrost operation through the stop valve and the restrictor when the stop valve is open, and
retaining the refrigerant in the condenser during the single defrost operation to absorb ambient heat when the stop valve is closed.

8. The method according to claim 7 wherein the defrosting operation is carried out at regular intervals.

9. The method according to claim 8 and further comprising monitoring an icing of the evaporator and performing the defrosting operation if a predetermined amount of evaporator icing is detected.

10. The refrigerating machine according to claim 1 and further comprising a timer operatively connected to the control unit.

11. The domestic refrigerating appliance according to claim 6, wherein the control unit is configured to close the stop valve occasionally when the compressor is switched off, open the stop valve occasionally when the compressor is switched off, and open the stop valve when the compressor is switched on.

12. The domestic refrigerating appliance according to claim 6 and further comprising an icing sensor disposed on the evaporator, the icing sensor being operatively connected to the control unit.

13. The domestic refrigerating appliance according to claim 6 and further comprising a timer operatively connected to the control unit.

14. The domestic refrigerating appliance according to claim 6 and further comprising an electric heating apparatus operatively associated with the evaporator.

15. The domestic refrigerating appliance according to claim 6 and further comprising a restrictor disposed in the refrigerant path from the stop valve to the evaporator.

16. The method according to claim 7, wherein the stop valve is closed occasionally when the compressor is switched off, the stop valve is opened occasionally when the compressor is switched off, and the stop valve is opened when the compressor is switched on.

17. The method according to claim 7, wherein icing of the evaporator is sensed by an icing sensor disposed on the evaporator, the icing sensor being operatively connected to the control unit.

18. The method according to claim 7, wherein the controlling of the stop valve is determined by a timer operatively connected to the control unit.

19. The method according to claim 7 and further comprising heating the evaporator with an electric heating apparatus operatively associated with the evaporator.

20. The method according to claim 7 and further comprising restricting a flow of refrigerant from the stop valve to the evaporator with a restrictor disposed in the refrigerant path from the stop valve to the evaporator.

* * * * *

UNITED STATES PATENT AND TRADEMARK OFFICE
CERTIFICATE OF CORRECTION

PATENT NO. : 8,601,831 B2
APPLICATION NO. : 12/310340
DATED : December 10, 2013
INVENTOR(S) : Fotiadis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this
Twenty-second Day of September, 2015

Michelle K. Lee
*Director of the United States Patent and Trademark Office*